(12) United States Patent
Nayak et al.

(10) Patent No.: US 11,551,548 B1
(45) Date of Patent: Jan. 10, 2023

(54) APPARATUS AND METHODS FOR PREDICTING WRONG-WAY-DRIVING EVENTS

(71) Applicant: HERE GLOBAL B.V., Eindhoven (NL)

(72) Inventors: Amarnath Nayak, Mumbai (IN); Jerome Beaurepaire, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/518,121

(22) Filed: Nov. 3, 2021

(51) Int. Cl.
*G08G 1/056* (2006.01)

(52) U.S. Cl.
CPC .................. *G08G 1/056* (2013.01)

(58) Field of Classification Search
None
See application file for complete search history.

(56) References Cited

U.S. PATENT DOCUMENTS

| | | | |
|---|---|---|---|
| 8,947,259 B2 | 2/2015 | Tagawa et al. | |
| 10,351,131 B2 | 7/2019 | Al-Deek et al. | |
| 10,442,429 B2 | 10/2019 | Salter et al. | |
| 10,654,491 B2 | 5/2020 | Nakamura | |
| 2015/0148987 A1 | 5/2015 | Jeschke et al. | |
| 2020/0258391 A1* | 8/2020 | Raichelgauz | G08G 1/22 |

OTHER PUBLICATIONS

Dr. Doug Brooks, et al., "Righting the Wrong-Way Driving Problem," Technology Today (Summer 2018) (6 pgs.).

* cited by examiner

*Primary Examiner* — John F Mortell
(74) *Attorney, Agent, or Firm* — Peter H. Yu; Here Global B.V.

(57) ABSTRACT

An apparatus, method and computer program product are provided for predicting wrong-way-driving events. A WWD event defines an event in which a vehicle travels in a direction opposing a traffic direction designated for a portion of a road. In one example, the apparatus estimates a likelihood of portion of the road inducing a wrong-way-driving (WWD) event by using a machine learning model as a function of map data, sensor data, or a combination thereof. If the likelihood satisfies a threshold, the apparatus updates a map layer to indicate the WWD event at the portion of the road.

19 Claims, 12 Drawing Sheets

FIG. 5

| Road segment identifier | Road works in the road segment? | Map age in months | Ramp junction? | Functional Class of road segment? | Season | Number of WWD events | ... |
|---|---|---|---|---|---|---|---|
| Segment_1 | Yes | 24 | Yes | 1 | Winter | 12 | ... |
| Segment_2 | No | 12 | No | 3 | Autumn | 5 | ... |
| Segment_3 | No | 5 | Yes | 3 | Spring | 4 | ... |
| Segment_4 | Yes | 4 | No | 5 | Summer | 1 | ... |
| ... | ... | ... | ... | ... | ... | ... | ... |

501 / 503 / 505 / 507 / 509 / 511 / 513 / 515

APPARATUS AND METHODS FOR PREDICTING WRONG-WAY-DRIVING EVENTS

TECHNICAL FIELD

The present disclosure generally relates to the field of navigation, associated methods and apparatus, and in particular concerns, for example, an apparatus configured to training and using a machine learning model to predict wrong-way-driving (WWD) events associated with vehicles.

BACKGROUND

Autonomous vehicles rely on map data to traverse a road network; however, since attributes of the road network dynamically change over time, map data indicating such attributes may be outdated. Autonomous vehicles that rely on such map data may deviate from their designated paths of travel. For example, one of such vehicles may determine that the vehicle is driving in a lane at a direction that opposes a traffic direction designated for the lane (as indicated in the map data). Such scenario may increase a likelihood of rendering adverse road conditions, such as accidents.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to: (i) receive wrong-way-driving (WWD) data indicating a WWD event; (ii) responsive to receiving the WWD data, determine one or more attributes associated with the WWD event based on sensor data, map data, or a combination thereof; and (iii) train a machine learning model for estimating a likelihood of one or more other WWD events based on the one or more attributes. The WWD event defines an event in which a vehicle travels in a direction opposing a traffic direction designated for a portion of a road.

According to a second aspect, a non-transitory computer-readable storage medium having computer program code instructions stored therein is described. The computer program code instructions, when executed by at least one processor, cause the at least one processor to: (i) determine a route associated with a vehicle; (ii) using a machine learning model as a function of map data, sensor data, or a combination thereof, estimate a likelihood of the route including a portion of a road inducing a wrong-way-driving (WWD) event, and (iii) responsive to the likelihood satisfying a threshold, cause a notification to a user device associated with the vehicle, the vehicle, or a combination thereof. The WWD event defines an event in which a vehicle travels in a direction opposing a traffic direction designated for the portion. The machine learning model is trained to predict the WWD event based on one or more attributes associated with WWD events.

According to a third aspect, a method of determining a route based on one or more predicted wrong-way-driving (WWD) events is described. The method includes: (i) receiving a destination for a vehicle as input; (ii) using a machine learning model as a function of map data, sensor data, or a combination thereof, estimating a likelihood of a first subset of a plurality of road segments inducing a WWD event; and (iii) responsive to the likelihood satisfying a threshold, selecting a second subset from the plurality of road segments as the route to the destination. The WWD event defines an event in which a vehicle travels in a direction opposing a traffic direction designated for a portion of a road. The machine learning model is trained to predict the WWD event based on a combination of attributes associated with WWD events.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings:

FIG. 5 illustrates an example table representing historical data recorded by the calculation module of FIG. 3;

DETAILED DESCRIPTION

Modern road networks are envisioned to include a plurality of autonomous vehicles traversing therein without necessitating constant human-intervention for operating said vehicles. The autonomous vehicles rely on sensor data and map data to localize and accurately traverse the road network; however, geographical attributes of road networks inevitably change over time. As such, representations of such attributes in map data may provide inaccurate information for instances in which the map data are relied upon. Autonomous vehicles that rely on outdated map data may encounter a road segment that causes the vehicles to traverse in a direction opposing a direction of traffic designated for the road segment. Herein, an event in which a vehicle travels in a direction opposing a traffic direction designated for a portion of a road will be referred as a wrong-way-driving (WWD) event. A WWD event may render an adverse impact for vehicles (and systems associated thereto) involved in the event in that the WWD event requires an immediate investigation for the cause of the WWD event. For example, if the cause is due to the fault of the vehicle rendering the WWD event, the vehicle must be serviced or decommissioned. Alternatively, if a roadwork renders the WWD event, the map data must be updated to indicate the roadwork. However, rendering such investigation only after the WWD event occurs does not provide any foresight for autonomous vehicles to prepare encounters with potential WWD events at different locations. There will now be described an apparatus and associated methods that may address these issues.

Figure 1:
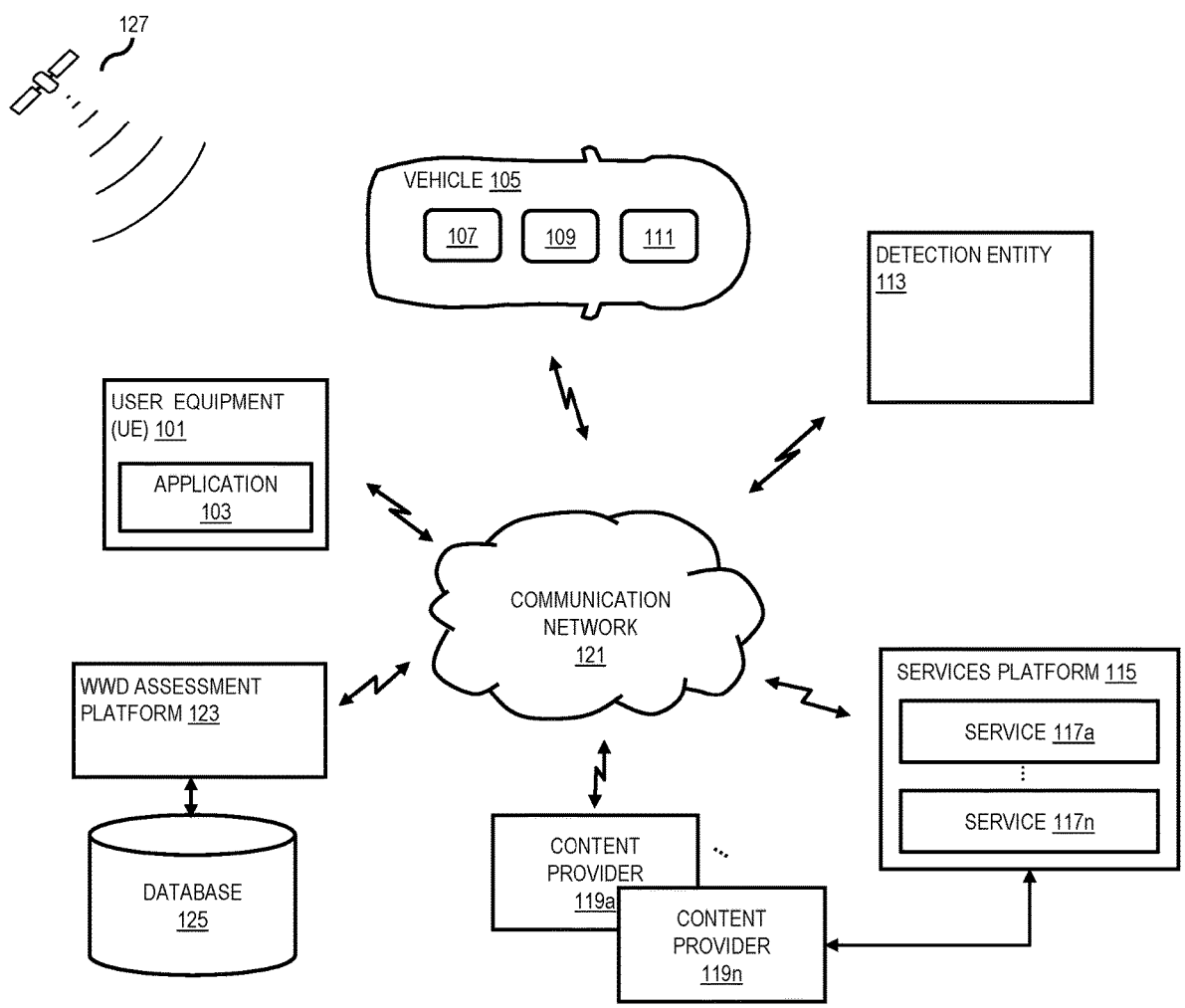
FIG. 1 illustrates a diagram of a system capable of predicting WWD events.

FIG. 1 is a diagram of a system 100 capable of predicting WWD events, according to one embodiment. The system includes a user equipment (UE) 101, a vehicle 105, a detection entity 113, a services platform 115, content providers 119a-119n, a communication network 121, a WWD assessment platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the WWD assessment platform 123 via the communication network 121. The WWD assessment platform 123 performs one or more functions associated with predicting WWD events and providing responses to the WWD events. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with one or more vehicles (including the vehicle 105), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.). In one embodiment, the one or more vehicles may have cellular or Wi-Fi connection either through the inbuilt communication equipment or from the UE 101 associated with the vehicles. The application 103 may assist in conveying information regarding at least one attribute associated a road segment via the communication network 121. In one embodiment, the information may indicate a prediction of whether a road segment will induce a WWD event.

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the WWD assessment platform 123 and perform one or more functions associated with the functions of the WWD assessment platform 123 by interacting with the WWD assessment platform 123 over the communication network 121.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. Herein, the vehicle 105 may represent a single vehicle or a plurality of vehicles. In the illustrated embodiment, the vehicle 105 is an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle 105 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 105, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the UE 101 may be integrated in the vehicle 105, which may include assisted driving vehicles such as autonomous vehicles, highly assisted driving (HAD), and advanced driving assistance systems (ADAS).

Any of these assisted driving systems may be incorporated into the UE 101. Alternatively, an assisted driving device may be included in the vehicle 105. The assisted driving device may include memory, a processor, and systems to communicate with the UE 101. In one embodiment, the vehicle 105 may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 105 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In this illustrated example, the vehicle 105 includes a plurality of sensors 107, an on-board computing platform 109, and an on-board communication platform 111. The sensors 107 may include image sensors (e.g., electronic imaging devices of both analog and digital types, which include digital cameras, camera modules, camera phones, thermal imaging devices, radar, sonar, lidar, etc.), a global positioning sensor for gathering location data, a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the vehicle 105 along a path of travel, etc. In a further embodiment, sensors about the perimeter of the vehicle 105 may detect the relative distance of the vehicle 105 from road objects (e.g., road markings), lanes, or roadways, the presence of other vehicles, pedestrians, traffic lights, road objects, road features (e.g., curves) and any other objects, or a combination thereof. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies. One or more of the sensors 107 may be installed on the exterior surface or external components of the vehicle 105, within the interior cabin of the vehicle 105, between the interior cabin and the exterior surface of the vehicle 105, or a combination thereof.

The on-board computing platform 109 performs one or more functions associated with the vehicle 105. In one embodiment, the on-board computing platform 109 may aggregate sensor data generated by at least one of the sensors 107 and transmit the sensor data via the on-board communications platform 111. The on-board computing platform 109 may receive control signals for performing one or more of the functions from the WWD assessment platform 123, the UE 101, the services platform 115, one or more of the content providers 119a-119n, or a combination thereof via the on-board communication platform 111. The on-board computing platform 109 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The detection entity 113 may be a vehicle (e.g., similar to the vehicle 105), a drone, a road-side sensor (e.g., a sensor installed within a road pavement), or a device mounted on a stationary object within or proximate to a road segment (e.g., a traffic light post, a sign post, a post, a building, etc.). The detection entity 113 may be equipped with image sensors (e.g., electronic imaging devices of both analog and digital types, which include digital cameras, camera modules, camera phones, thermal imaging devices, radar, sonar, lidar, etc.), light sensors (e.g., photodetectors), temperature sensors, audio recorder for gathering audio data, velocity sensors, oriental sensors augmented with height sensor and acceleration sensor, tilt sensors, etc. In a further embodiment, sensors about the perimeter of the detection entity 113 may detect the relative distance thereof from road objects (e.g., road markings), lanes, or roadways, the presence of other vehicles, pedestrians, traffic lights, road objects, road features (e.g., curves) and any other objects, or a combination thereof. In one embodiment, the detection entity 113 may include GPS receivers to obtain geographic coordinates from satellites 127 for determining current location and time associated with at which the detection entity 113 acquires sensor data. The location can be determined by a triangulation system such as A-GPS, Cell of Origin, or other location extrapolation technologies. In one embodiment, if the detection entity 113 is a stationary device (e.g., a traffic camera), the detection entity 113 may store contextual information indicating a location at which the detection entity 113 is located, a direction at which a particular sensor (e.g., an image sensor) of the detection entity 113 is facing, or a combination thereof. In one embodiment, the detection entity 113 may be a mobile device (e.g., similar to the UE 101) and may be equipped with any of the aforementioned sensors. Such mobile device may be capable of providing images and information indicating a time, location, and orientation at which the images are acquired.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The service platform 115 may be an original equipment manufacturer (OEM) platform that provides one or more services 117a-117n (collectively referred to as services 117). In one embodiment the one or more service 117 may be sensor data collection services. By way of example, vehicle sensor data provided by the sensors 107 may be transferred to the UE 101, the WWD assessment platform 123, the database 125, or other entities communicatively coupled to the communication network 121 through the service platform 115. The services 117 may also be other third-party services and include mapping services, navigation services, travel planning services, weather-based services, notification services, social networking services, content (e.g., audio, video, images, etc.) provisioning services, application services, storage services, contextual information determination services, location-based services, information-based services, etc. In one embodiment, the services platform 115 uses the output data generated by of the WWD assessment platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the vehicle 105, the database 125, the WWD assessment platform 123, or the combination thereof. The content provided may be any type of content, such as map content, textual content, audio content, video content, image content, etc. In one embodiment, the content providers 119 may provide content that may aid in predicting WWD events, and/or other related characteristics. In one embodiment, the content providers 119 may also store content associated with the UE 101, the vehicle 105, services platform 115, the vehicle 105, the database 125, the WWD assessment platform 123, or the combination thereof. In another embodiment, the content providers 119 may manage access to a central repository of data, and offer a consistent, standard interface to data, such as a repository of the database 125.

In the illustrated embodiment, the WWD assessment platform 123 may be a platform with multiple interconnected components. The WWD assessment platform 123 may include multiple servers, intelligent networking devices, computing devices, components and corresponding software for predicting WWD events. It should be appreciated that that the WWD assessment platform 123 may be a separate entity of the system 100, included within the UE 101 (e.g., as part of the applications 103), included within the vehicle 105 (e.g., as part of an application stored in memory of the on-board computing platform 109), included within the services platform 115 (e.g., as part of an application stored in server memory for the services platform 115), or a combination thereof.

The WWD assessment platform 123 is capable of identifying whether a WWD event has occurred. In one embodiment, the WWD assessment platform 123 may detect that a WWD event has occurred when the vehicle 105: (1) deviates from a traffic direction designated for a portion of a road; (2) detects one or more traffic-based objects (e.g., a digital road sign indicating roadworks, a road sign, traffic cones, traffic barriers, or other road objects that indicate a direction of traffic) within a location of the WWD event; (3) fails to detect one or more road objects (e.g., lane markings) at the location as indicated by map data; (4) detects a change with respect to one or more road objects at the location as indicated by map data; (5) detects that a relative distance between the front of the vehicle and another object (e.g., a vehicle, a barrier, etc.) is less than a threshold distance (e.g., the relative distance becomes less than 4.2 meters) at the location; (6) detects that a speed at which the vehicle 105 and another vehicle converge exceeds a threshold speed (e.g., a speed at which the vehicle is moving); or (7) a combination thereof. In one embodiment, the WWD assessment platform 123 determines that the WWD event is occurring when a confidence value associated the WWD event reaches or exceed a threshold value (e.g., 75 percent). In such embodiment, the confidence value increases as a number of positive indications of the WWD event increases. In one embodiment, one or more detection entities 113 proximate to the location of the vehicle 105 may observe the vehicle 105, one or more vehicles proximate to the vehicle 105, geographic attributes of a road segment, road objects within the road segment, or a combination thereof and generate sensor data. Based on the sensor data, the WWD assessment platform 123 determines an existence of a WWD event.

When the WWD assessment platform 123 detects a WWD event, the WWD assessment platform 123 acquires sensor data from one or more sources that are involved in the WWD event. The one or more sources may be: (1) the vehicle (e.g., vehicle 105) that has detected the existence of the WWD event; (2) one or more detection entities 113 that are in the location of the WWD event at an initial time point of the WWD event; (3) one or more detection entities 113 that were in the location of the WWD event at one or more prior time points; (4) one or more detection entities 113 that are predicted be in the location of the WWD event at one or more future time points; (6) the database 125; (7) the services platform 115; (8) one or more content providers 119; or (9) a combination thereof. By way of example, a window of period in which the WWD assessment platform 123 relies on the one or more detection entities 113 may be within several minutes to several hours with respect to the initial time point. The sensor data may indicate geographical attributes and/or dynamic attributes associated with the WWD events. The geographical attributes may indicate: (1) a number of traffic-based objects within the location of the WWD event; (2) a type of each traffic-based object within the location; (3) an orientation of each traffic-based object within the location; (4) a number of non-traffic-based objects within the location; (5) a type of each non-traffic-based object within the location (6) an orientation of each non-traffic-based object within the location; (7) a type of road in which the WWD event occurs; (8) a number of point-of-interests (POI) within the location; (9) a type of each POI within the location; (10) an orientation of each POI within the location; (11) a city/town in which the WWD event occurs; or (12) a combination thereof. The dynamic attributes may indicate: (1) a degree of traffic impacting the location of the WWD event; (2) a number of vehicles within the location; (3) a type of each vehicle within the location; (4) a heading of each vehicle within the location; (5) a time at which the WWD event occurs; (6) a date in which the WWD event occurs; (7) a weather condition of the location; (8) light-based attributes associated with the WWD event (e.g., a contrast level of light impacting the location of the WWD event, a brightness level of the light, a temperature level of the light, a sun angle associated with the location, etc); (9) whether the location is impacted by roadworks; or (x) a combination thereof. The WWD assessment platform 123 may also acquire map data associated with the location of the WWD event. The map data may include one or more data points indicating attributes (e.g., geographical attributes) associated with the location. Using the map data, the WWD assessment platform 123 may acquire map age data indicating an amount of time that one or more data points of map data associated with the location of the WWD event has not been updated. Each data point defines one or more attributes of one or more objects within the location (e.g., traffic-based object). For example, one of the data points may indicate that an existence of a traffic barrier within a location of a WWD event has not been validated for two days. In one embodiment, the WWD assessment platform 123 may determine a difference of one or more objects as indicated by the map data and the sensor data. For example, the sensor data may indicate an existence of a traffic barrier within the location of the WWD event; whereas, the map data does not include a datapoint that defines the traffic barrier within the location of the WWD event.

In one embodiment, when the WWD assessment platform 123 determines that a WWD event has occurred, the WWD assessment platform 123 may attempt to provide a response to the situation by: (1) identifying a correct portion of a road (as indicated in map data); (2) determining whether a route from the current position of the vehicle 105 to the correct portion does not interfere with any obstructing objects (e.g., another vehicle, a barrier, a cone, etc.); and (3) if such route exists, causing the vehicle 105 to move to the correct portion. In one embodiment, if a WWD event occurs, the WWD assessment platform 123 may provide: (1) a notification of the WWD event; (2) a notification of a handover from an autonomous (or semi-autonomous) mode to a manual mode; and (3) cause the vehicle 105 to execute the handover. In one embodiment, if a WWD event occurs, the WWD assessment platform 123 may: (1) identify a designated area (e.g., a side of a road, an off-road area, etc.); (2) determine whether a route from the vehicle 105 to the designated area does not interfere with any physical object; (3) cause the vehicle 105 to move to the designated area if such route exists; and (3) once the vehicle 105 arrives at the designated area, cause the vehicle 105 to stop moving. Alternatively, if such designated area is not available, the WWD assessment platform 123 may: (1) cause the vehicle 105 to stop moving; (2) activate a vehicle horn; or (3) a combination thereof. In one embodiment, as the vehicle 105 waits in the designated area, the WWD assessment platform 123 may cause a deployment of a designated vehicle (e.g., a police car, a specialized vehicle, etc.) to assist the vehicle 105 by guiding the vehicle 105 through the location of the WWD event. In one embodiment, if a WWD event occurs, the WWD assessment platform 123 causes the vehicle 105 to rely more on sensor data rather than map data as the vehicle 105 navigates through the location of the WWD event.

In certain scenarios, the vehicle 105 may detect a WWD event due to a road work that changes directions of traffic. As such, in one embodiment, if a WWD event is detected, the WWD assessment platform 123 may attempt to identify an intended path of travel for vehicles to traverse the location of the WWD. In one embodiment, the WWD assessment platform 123 may: (1) identify a locus of navigation for the nearest vehicle in front of the vehicle 105 and the nearest vehicle behind the vehicle 105; and (2) compare the direction of the vehicle 105 with respect to the directions of the two vehicles. If the directions of the two vehicles are in the same direction as the vehicle 105, the WWD assessment platform 123 determines that the vehicle 105 is traversing the intended path of travel for the location of the WWD event, even if the map data associated with the location indicate otherwise. In one embodiment, the WWD assessment platform 123 may cause the vehicle 105 to provide a query to one or more vehicles proximate to the vehicle 105 to determine the intended path of travel for the location of the WWD event. If a number of vehicles proximate to the vehicle 105 confirms the same intended path of travel, the WWD assessment platform 123 may cause the vehicle 105 may cause the vehicle 105 to traverse the location of the WWD event using the intended path of travel. In such embodiment, the WWD assessment platform 123 may use the intended path of travel to update map data associated with the location and provide the updated map data to one or more other vehicles that encounter the location at one or more future times.

In one embodiment, when a WWD event occurs, the WWD assessment platform 123 analyzes the sensor data to determine whether the WWD event has occurred due to a change in one or more types of geographical attributes associated with the WWD event. If such change is detected, the WWD assessment platform 123 may update map data associated with the location of the WWD event. For example, if the sensor data indicate that one or more road lane markings in the location of the WWD event has changed with respect to one or more data points indicating the one or more road lane markings in map data, the WWD assessment platform 123 may update the one or more data points to reflect the attributes of the one or more road lane markings as indicated by the sensor data. In one embodiment, the WWD assessment platform 123 may update one or more geographical attributes associated with a WWD event when a designated number of instances in which sensor data validate a change in one or more geographical attributes at the location of the WWD event satisfy a threshold number. In one embodiment, the WWD assessment platform 123 analyzes the sensor data to determine one or more paths in which a plurality of vehicles moves in a location of a WWD event and uses the path to update the map data associated with the location.

In one embodiment, when a WWD event occurs, the WWD assessment platform 123 cause a notification associated with the WWD event to: (1) UE 101; (2) one or more other UEs associated with one or more passengers of the vehicle 105; (3) one or more passengers of the vehicle 105 via interior speakers within the cabin of the vehicle 105; (4) one or more vehicles proximate to the vehicle 105 or cause the vehicle 105 to provide the notification to the one or more vehicles via vehicle-to-vehicle (V2V) communication; or (5) a combination thereof. In such embodiment, the notification may indicate: (1) an existence of the WWD event; (2) a location of the WWD event; (3) a cause of the WWD event; (4) a reaction/response provided to the vehicle 105 by the WWD assessment platform 123 (e.g., causing the vehicle 105 to move to a designated area, causing the vehicle 105 to traverse an intended path of travel, etc.); or (5) a combination thereof.

In one embodiment, when a WWD event occurs, the WWD assessment platform 123 determines whether an adversarial source is remotely taking control of the vehicle 105 to render the WWD event. In such embodiment, the WWD assessment platform 123 may determine that the control of the vehicle 105 is being influenced by the adversarial source when the vehicle 105 deviates from a route assigned for the vehicle. If the WWD assessment platform 123 determines that the vehicle 105 is being influenced by the adversarial source, the WWD assessment platform 123 may: (1) generate a command that causes the vehicle 105 to disable the mobility thereof (e.g., via disconnecting the motor from the battery, turning off engine, etc.); (2) inform an establishment (e.g., a police department); (3) inform the services platform 115 (the OEM of the vehicle 105); or (4) a combination thereof. The services platform 115 may also provide a command that causes the vehicle 105 to disable the mobility thereof.

The WWD assessment platform 123 receives sensor data not only from the vehicle 105 and/or one or more detection entities 113 involved in a WWD event, but also from one or more other vehicles (similar to vehicle 105) and/or one or more other detection entities 113 involved in one or more other WWD events. For each WWD event, the WWD assessment platform 123 aggregates sensor data, map data, and weather data associated with the WWD event, and the aggregated data is used as historical data. Using the historical data, the WWD assessment platform 123 may train a machine learning model to estimate a likelihood (i.e., a probability score) of a WWD event occurring within a road network. Once the machine learning model is trained, the machine learning model may receive data indicating a route associated with a vehicle, map data associated with the route, sensor data from one or more detection entities 113 within the route, and weather forecast data associated with one or more locations within the route. Based on the received data, the machine learning model outputs one or more probability scores for one or more locations of the route. The WWD assessment platform 123 may update a map layer to indicate one or more locations and the one or more probability scores associated thereto. For each probability score that exceeds a threshold score (e.g., 75 percent), the WWD assessment platform 123 generates: (1) a data point associated with a location in the map layer; (2) a notification indicating that a WWD event is likely to occur within a location of the route; (3) an alternative route that avoids the location; or (4) a combination thereof.

In the illustrated embodiment, the database 125 stores information on road links (e.g., road length, road breadth, slope information, curvature information, etc.) and probe data for one or more road links (e.g., traffic density information). In one embodiment, the database 125 may include any multiple types of information that can provide means for aiding in predicting WWD events. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, the WWD assessment platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
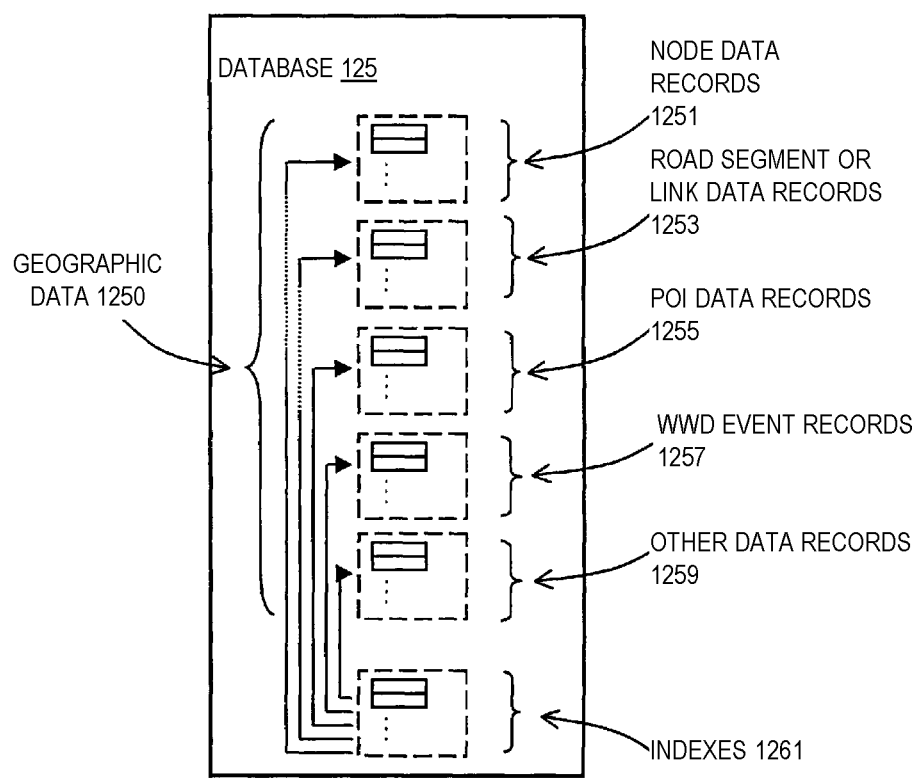
FIG. 2 illustrates a diagram of the database within the system of FIG. 1.

FIG. 2 is a diagram of a database 125 (e.g., a map database), according to one embodiment. In one embodiment, the database 125 includes geographic data 1250 used for (or configured to be compiled to be used for) mapping and/or navigation-related services. In one embodiment, the following terminology applies to the representation of geographic features in the database 125.

a. "Node"—A point that terminates a link.

b. "road/line segment"—A straight line connecting two points.

c. "Link" (or "edge")—A contiguous, non-branching string of one or more road segments terminating in a node at each end.

In one embodiment, the database 125 follows certain conventions. For example, links do not cross themselves and do not cross each other except at a node. Also, there are no duplicated shape points, nodes, or links. Two links that connect each other have a common node.

As shown, the database 125 includes node data records 1251, road segment or link data records 1253, point of interest (POI) data records 1255, WWD event records 1257, other records 309, and indexes 1261, for example. More, fewer or different data records can be provided. In one embodiment, additional data records (not shown) can include cartographic ("carto") data records, routing data, and maneuver data. In one embodiment, the indexes 1261 may improve the speed of data retrieval operations in the database 125. In one embodiment, the indexes 1261 may be used to quickly locate data without having to search every row in the database 125 every time it is accessed.

In exemplary embodiments, the road segment data records 1253 are links or segments representing roads, streets, or paths, as can be used in the calculated route or recorded route information for determination of one or more personalized routes. The node data records 1251 are end points (such as intersections) corresponding to the respective links or segments of the road segment data records 1253. The road link data records 1253 and the node data records 1251 represent a road network, such as used by vehicles, cars, and/or other entities. Alternatively, the database 125 can contain path segment and node data records or other data that represent pedestrian paths or areas in addition to or instead of the vehicle road record data, for example.

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, buildings, stores, parks, etc. The database 125 can include data about the POIs and their respective locations in the POI data records 1255. The data about the POIs may include attribute data associated with the POIs. The attribute data may indicate a type of POI, a shape of POI, a dimension(s) of POI, a number of stories included in each of the POIs, etc. The database 125 can also include data about places, such as cities, towns, or other communities, and other geographic features, such as bodies of water, mountain ranges, etc. Such place or feature data can be part of the POI data records 1255 or can be associated with POIs or POI data records 1255 (such as a data point used for displaying or representing a position of a city).

The WWD event records 1257 include records of past WWD events that have occurred within a road network. Each record of a past WWD event may indicate a location in which the WWD event has occurred (e.g., a portion of a road segment or a node), geographical attributes associated with the location, dynamic attributes associated with the location, a cause of the WWD event, intended path of travel for the WWD event, or a combination thereof. The WWD event records 1257 may also store a map layer of one or more locations that is likely to include one or more WWD events. Such map layer may be generated and maintained by the machine learning model of WWD assessment platform 123. The one or more locations may be associated with one or more probability scores indicating a likelihood of a WWD event within each of the one or more locations.

Other records 309 may include data indicating light-based attributes associated with one or more road segments within a road network. Such data may be maintained in a map layer of light-based attributes. The light-based attributes may sensor data indicating properties of light impacting the one or more road segments.

In one embodiment, the database 125 can be maintained by one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe locations in which WWD events occur or have occurred and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for predicting WWD events may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 3:
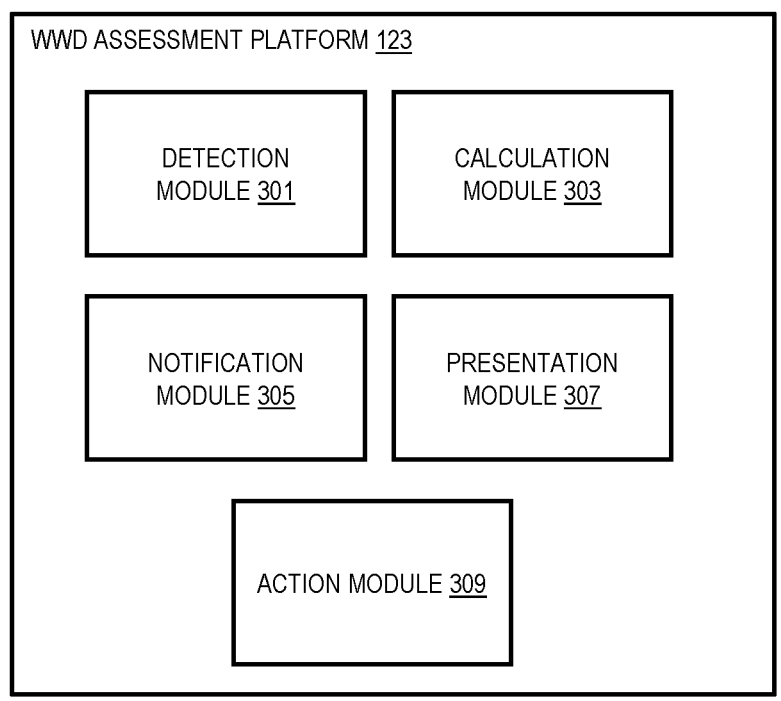
FIG. 3 illustrates a diagram of the components of the WWD assessment platform within the system of FIG. 1.

FIG. 3 is a diagram of the components of the WWD assessment platform 123, according to one embodiment. By way of example, the WWD assessment platform 123 includes one or more components for predicting WWD events. It is contemplated that the functions of these components may be combined in one or more components or performed by other components of equivalent functionality. In this embodiment, the WWD assessment platform 123 includes a detection module 301, a calculation module 303, a notification module 305, a presentation module 307, and a control or action module 309.

Figure 4A:
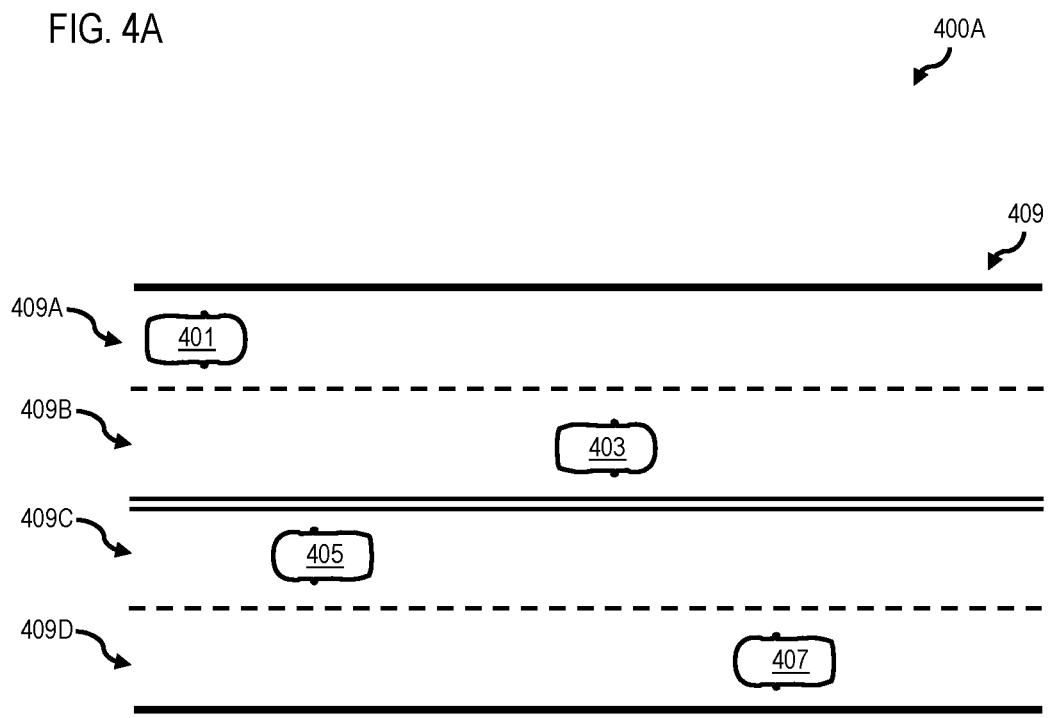
FIG. 4A illustrates a first example scenario in which vehicles traverse a first portion of a road segment.
Figure 4B:
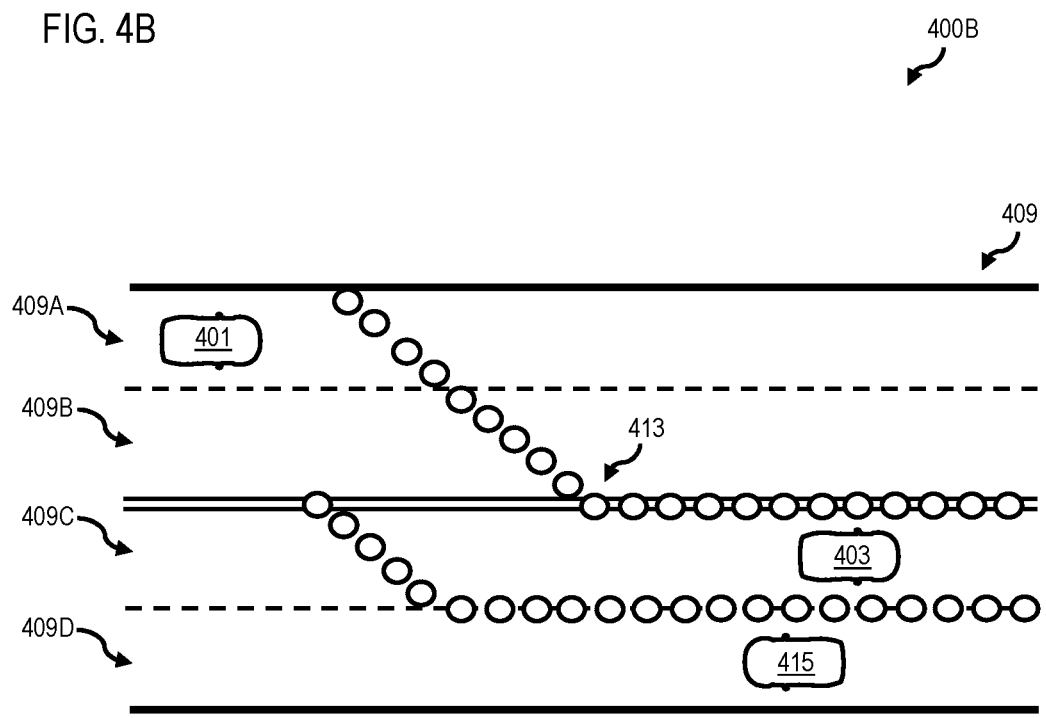
FIG. 4B illustrates a second example scenario in which some of the vehicles traverse a second subsequent portion of the road segment including a road work.

The detection module 301 is capable of acquiring data from the vehicle 105, one or more detection entities 113, or a combination thereof and detecting an occurrence of a WWD event. In one embodiment, the detection module 301 acquires sensor data from the vehicle 105 to determine whether a WWD event is occurring. If the sensor data indicates: (1) that the vehicle 105 is deviating from a traffic direction designated for a portion of a road; (2) existence of one or more traffic-based objects (e.g., a digital road sign indicating roadworks, a road sign, traffic cones, traffic barriers, or other road objects that influence a direction of traffic) within a location of the WWD event; (3) a failure to detect one or more road objects (e.g., lane markings) at the location as indicated by map data; (4) a change with respect to one or more road objects at the location as indicated by map data; (5) that a relative distance between the front of the vehicle and another object (e.g., a vehicle, a barrier, etc.) is less than a threshold distance (e.g., the relative distance becomes less than 4.2 meters) at the location; (6) that a speed at which the vehicle 105 and another vehicle converge exceeds a threshold speed (e.g., a speed at which the vehicle is moving); or (7) a combination thereof, the detection module 301 determines that a WWD event is occurring. For example, FIG. 4A illustrates a first example scenario 400A in which vehicles traverse a first portion of a road segment. In the illustrated example, vehicles 401, 403, 405, and 407 are traversing a first portion of a multi-lane undivided road segment 409. Two lanes 409A and 409B of the road segment 409 are designated with a first traffic direction, and two lanes 409C and 409D of the road segment 409 are designated with a second opposing traffic direction. FIG. 4B illustrates a second example scenario 400B in which some of the vehicles traverse a second subsequent portion of the road segment 409 including a road work. In the illustrated example, vehicles 401, 403, and 415 are traversing a second portion of the road segment 409 following the first portion thereof. In the second scenario 400B, a road work 413 having a double-lane closure is impacting the second portion, thereby forcing the vehicles 401 and 403 to drive through the lane 409C and another vehicle 415 to drive through the lane 409D. The vehicle 401 generates sensor data indicating the cone placements of the road work 413 and transmits the sensor data to the detection module 301. The detection module 301 also determine that the vehicle 403 is moving in a direction that opposes the traffic direction designated for the lane 409C. Accordingly, the detection module 301 determines that a WWD event is impacting the road segment 409. In one embodiment, the detection module 301 determines that the WWD event is occurring when a confidence value associated the WWD event reaches or exceed a threshold value (e.g., 75 percent). In such embodiment, the confidence value increases as a number of positive indications of the WWD event increases. In one embodiment, one or more detection entities 113 proximate to the location of the vehicle 105 may observe the vehicle 105, one or more vehicles proximate to the vehicle 105, geographic attributes of a road segment, road objects within the road segment, or a combination thereof and generate sensor data. Based on the sensor data, the detection module 301 determines an existence of a WWD event.

In one embodiment, when a WWD occurs, the detection module 301 acquires sensor data from one or more sources that are involved in the WWD event. The one or more sources may be: (1) the vehicle (e.g., vehicle 105) that has detected the existence of the WWD event; (2) one or more detection entities 113 that are in the location of the WWD event at an initial time point of the WWD event; (3) one or more detection entities 113 that were in the location of the WWD event at one or more prior time points; (4) one or more detection entities 113 that is predicted be in the location of the WWD event at one or more future time points; (5) the database 125; (6) the services platform 115; (7) one or more content providers 119; or (8) a combination thereof. By way of example, a window of period in which the detection module 301 relies on the one or more detection entities 113 may be within several minutes to several hours with respect to the initial time point. The sensor data may indicate geographical attributes and/or dynamic attributes associated with the WWD events. The geographical attributes may indicate: (1) a number of traffic-based objects within the location of the WWD event; (2) a type of each traffic-based object within the location; (3) an orientation of each traffic-based object within the location; (4) a number of non-traffic-based objects within the location; (5) a type of each non-traffic-based object within the location (6) an orientation of each non-traffic-based object within the location; (7) a type of road in which the WWD event occurs; (8) a length, width, gradient and/or curvature of a road segment or a portion thereof; (9) a relative position and/or orientation of one or more traffic-based objects and one/or one or more non-traffic-based objects with one or more road segments and/or one or more portions thereof; (10) a geometric patterns of one or more road segments or one or more portions thereof; (11) a number of POIs within the location; (12) a type of each POI within the location; (13) an orientation of each POI within the location; (14) a city/town in which the WWD event occurs; or (15) a combination thereof. The dynamic attributes may indicate: (1) a degree of traffic impacting the location of the WWD event; (2) a number of vehicles within the location; (3) a type of each vehicle within the location; (4) a heading of each vehicle within the location; (5) a time at which the WWD event occurs; (6) a date in which the WWD event occurs; (7) a weather condition of the location; (8) light-based attributes associated with the WWD event (e.g., a contrast level of light impacting the location of the WWD event, a brightness level of the light, a temperature level of the light, a sun angle associated with the location, etc); (9) whether the location is impacted by roadworks; or (x) a combination thereof. The detection module 301 may also acquire map data associated with the location of the WWD event. The map data may include one or more data points indicating attributes (e.g., geographical attributes) associated with the location. Using the map data, the detection module 301 may acquire map age data indicating an amount of time that one or more data points of map data associated with the location of the WWD event has not been updated.

When a WWD event is detected, the calculation module 303 may determine a route for the vehicle 105 or modify the route of the vehicle 105. In one embodiment, the calculation module 303 may identify a correct portion of a road (as indicated in map data) and determine whether a route from the current position of the vehicle 105 to the correct portion does not interfere with any obstructing objects. In one embodiment, the calculation module 303 may identify a designated area (e.g., a side of a road, an off-road area, etc.) in which the vehicle 105 can park prior to entering the location of the WWD event and determine whether a route from the current location of the vehicle 105 to the designated area does not interfere with any physical object. In one embodiment, if a WWD event is detected, the calculation module 303 may attempt to identify an intended path of travel for vehicles to traverse the location of the WWD. In one embodiment, the calculation module 303 may: (1) identify a locus of navigation for the nearest vehicle in front of the vehicle 105 and the nearest vehicle behind the vehicle 105; and (2) compare the direction of the vehicle 105 with respect to the directions of the two vehicles. If the directions of the two vehicles are in the same direction as the vehicle 105, the calculation module 303 determines that the vehicle 105 is traversing the intended path of travel for the location of the WWD event, even if the map data associated with the location indicate otherwise.

In one embodiment, when a WWD event occurs, the calculation module 303 analyzes the sensor data to determine whether the WWD event has occurred due to a change in one or more types of geographical attributes associated with the WWD event. If such change is detected, the calculation module 303 may update map data associated with the location of the WWD event. For example, if the sensor data indicate that one or more road lane markings in the location of the WWD event has changed with respect to one or more data points indicating the one or more road lane markings in map data, the calculation module 303 may update the one or more data points to reflect the attributes of the one or more road lane markings as indicated by the sensor data. In one embodiment, the calculation module 303 may update one or more geographical attributes of a location when a designated number of instances in which sensor data validate a change in one or more geographical attributes at the location satisfy a threshold number. In one embodiment, the calculation module 303 analyzes the sensor data to determine one or more paths in which a plurality of vehicles moves in a location of a WWD event and uses the path to update the map data associated with the location.

The calculation module 303 receives sensor data not only from the vehicle 105 and/or one or more detection entities 113 involved in a WWD event, but also from one or more other vehicles (similar to vehicle 105) and/or one or more other detection entities 113 involved in one or more other WWD events. For each WWD event, the calculation module 303 aggregates sensor data, map data, and weather data, and the aggregated data is used as historical data. For example, FIG. 5 illustrates an example table 500 representing historical data recorded by the calculation module 303. The historical data may ground truth data that are input to a machine learning model for estimating a likelihood (i.e., a probability score) of a WWD event occurring within a road network. In the illustrated example, the table 500 includes columns 501, 503, 505, 507, 509, 511, and 513 define a road segment, whether road works was impacting the road segment, map age (i.e., amount of time in which elements of the road segment were not updated in map data), whether the road segment is a ramp junction, a functional class of the road segment, the season in which sensor data was acquired, and a number of WWD events that have occurred within the road segment, respectively. It is contemplated that the table 500 may include one or more additional columns 515 defining any other attributes associated with the WWD events. Using the historical data as ground truth data, the calculation module 303 trains the machine learning model to estimate a likelihood (i.e., a probability score) of a WWD event occurring within a road network. Once the machine learning model is trained, the machine learning model may receive data indicating a route associated with a vehicle, map data associated with the route, sensor data from one or more detection entities 113 within the route, and weather forecast data associated with one or more locations within the route. Based on the received data, the machine learning model outputs one or more probability scores for one or more locations of the route. For each probability score that exceeds a threshold score (e.g., 75 percent), the calculation module 303 predicts an occurrence of a WWD event. In one embodiment, as the machine learning model continues to acquire historical data, the machine learning model may rank attributes of WWD events to identify one or more attributes that are most likely to induce a WWD event. The one or more attributes that are most likely to induce a WWD event may be assigned the greatest weight for determining the probability score. In one embodiment, the calculation module 303 may limit the amount of data needed to calculate the probability of a WWD event occurring by only acquiring data needed to calculate the one or more attributes that are most likely to induce a WWD event. In one embodiment, the machine learning model may be random forest, logistic, decision trees, neural networks, or a combination thereof.

The notification module 305 may generate a notification associated with a WWD event when the WWD event occurs. The notification module 305 may cause the notification to: (1) UE 101; (2) one or more other UEs associated with one or more passengers of the vehicle 105; (3) one or more passengers of the vehicle 105 via interior speakers within the cabin of the vehicle 105; (4) one or more vehicles proximate to the vehicle 105 or cause the vehicle 105 to provide the notification to the one or more vehicles via vehicle-to-vehicle (V2V) communication; or (5) a combination thereof. In such embodiment, the notification may indicate: (1) an existence of the WWD event; (2) a location of the WWD event; (3) a cause of the WWD event; (4) a reaction/response provided to the vehicle 105 by the WWD assessment platform 123 (e.g., causing the vehicle 105 to move to a designated area, causing the vehicle 105 to traverse an intended path of travel, etc.); or (5) a combination thereof. If a probability score indicating a likelihood of a WWD event occurring at a road segment exceeds a threshold score, the notification module 305 may generate a notification indicating that the WWD event is likely to occur within the road segment. The notification may include sound notification, display notification, vibration, or a combination thereof. In one embodiment, the notification module 305 may provide the notification to a local municipality/establishment.

Figure 6:
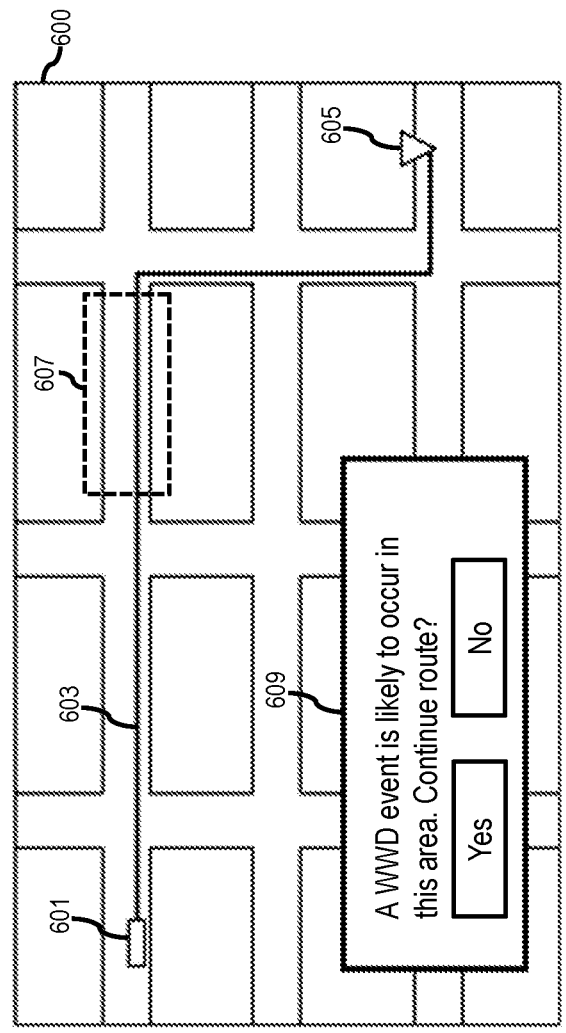
FIG. 6 illustrates an example visual representation rendered by the presentation module of FIG. 3.

The presentation module 307 obtains a set of information, data, and/or calculated results from other modules, and continues with providing a presentation of a visual representation to the UE 101. The visual representation may indicate any of the information presented by the notification module 305. For example, FIG. 6 illustrates an example visual representation 600 rendered by the presentation module 307. In the illustrated embodiment, the example visual representation 600 is a map including a representation of a vehicle 601, a route 603, a destination 605, a highlighted portion 607, and a message 609. In the illustrate embodiment, the highlighted portion 607 is predicted to induce a WWD event. As such, the presentation module 307 has generated the message 609 stating "A WWD EVENT IS LIKELY TO OCCUR IN THIS AREA. CONTINUE ROUTE?" and including a "YES" and "NO" prompt. In alternative embodiments, the visual representation may be provided without a route, thereby enabling a user to observe locations of one or more WWD events within a map. In one embodiment, the visual representation may be presented as a combination of map layers including a map layer indicating locations of predicted WWD events, a map layer indicating locations of WWD events and/or predicted WWD events, and other map layers indicating other information such road link, segment, node information, POI information, a type of weather affecting one or more areas, etc.

The action module 309 generates commands based on analysis executed by the calculation module 303. In one embodiment, the action module 309 generates commands for the vehicle 105 in response to the calculation module 303 detecting that: (1) the vehicle 105 is currently traversing a road segment impacted by a WWD event; (2) the vehicle 105 is encountering a road segment impacted by a WWD event; or (3) the vehicle 105 is encountering a road segment predicted to induce a WWD event. In one embodiment, when the detection module 301 detect a WWD event, the calculation module 303 and the action module 309 may attempt to provide a response to the situation by: (1) identifying a correct portion of a road (as indicated in map data); (2) determining whether a route from the current position of the vehicle 105 to the correct portion does not interfere with any obstructing objects (e.g., another vehicle, a barrier, a cone, etc.); and (3) if such route exists, causing the vehicle 105 to move to the correct portion. In one embodiment, if a WWD event occurs, the action module 309 may provide a command that causes the vehicle 105 to transition from an autonomous mode to a manual mode. In one embodiment, if a WWD event occurs, the action module 309 may cause the vehicle 105 to move to a designated area (e.g., a side of a road, off-road areas, etc.) and cause the vehicle 105 to stop moving once the vehicle 105 arrives at the designated area. Alternatively, if such designated area is not available, the action module 309 may: (1) cause the vehicle 105 to stop moving; (2) activate a vehicle horn; or (3) a combination thereof. In one embodiment, as the vehicle 105 waits in the designated area, the action module 309 may cause a deployment of a designated vehicle (e.g., a police car, a specialized vehicle, etc.) to assist the vehicle 105 by guiding the vehicle 105 through the location of the WWD event. In one embodiment, if a WWD event occurs, the action module 309 may cause the vehicle 105 to rely more on sensor data rather than map data as the vehicle 105 navigates through the location of the WWD event. In one embodiment, if the calculation module 303 determines that the vehicle 105 is encountering a road segment predicted to induce a WWD event, the action module 309 may alter a route of the vehicle 105 such that the route excludes the location of the WWD event.

The above presented modules and components of the WWD assessment platform 123 can be implemented in hardware, firmware, software, or a combination thereof. Though depicted as a separate entity in FIG. 3, it is contemplated that the WWD assessment platform 123 may be implemented for direct operation by the UE 101, the vehicle 105, the services platform 115, one or more of the content providers 119, or a combination thereof. As such, the WWD assessment platform 123 may generate direct signal inputs by way of the operating system of the UE 101, the vehicle 105, the services platform 115, the one or more of the content providers 119, of the combination thereof for interacting with the applications 103. The various executions presented herein contemplate any and all arrangements and models.

Figure 7:
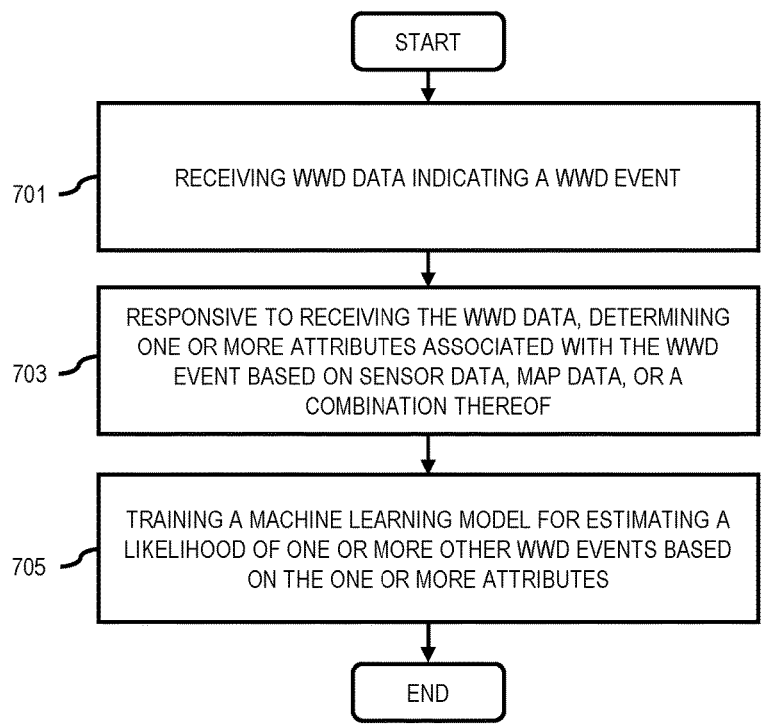
FIG. 7 illustrates a flowchart of a process for training a machine learning model to estimate a likelihood of one or more WWD events.
Figure 10:
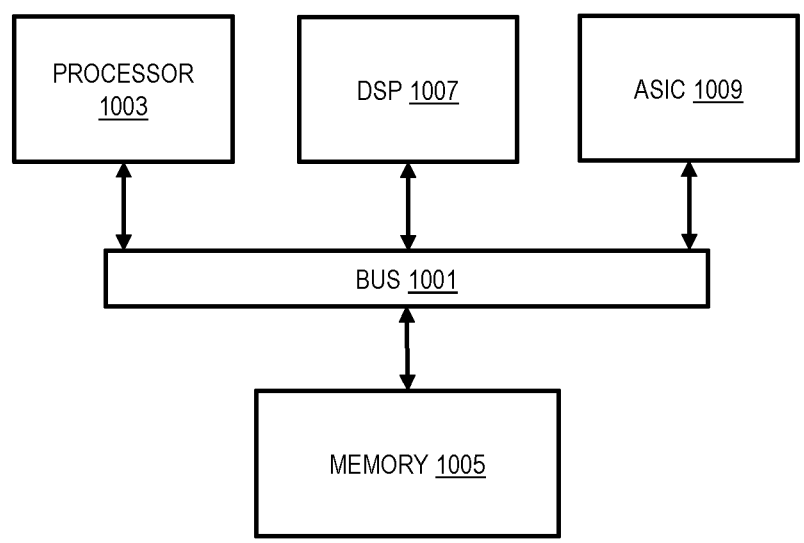
FIG. 10 illustrates a chip set or chip upon which an embodiment may be implemented.

FIG. 7 is a flowchart of a process 700 for training a machine learning model to estimate a likelihood of one or more WWD events, according to one embodiment. In one embodiment, the WWD assessment platform 123 performs the process 700 and is implemented in, for instance, a chip set including a processor and a memory as shown in FIG. 10.

In step 701, the WWD assessment platform 123 receives WWD data indicating a WDD event. The WWD data is generated when the vehicle 105: (1) deviates from a traffic direction designated for a portion of a road; (2) detects one or more traffic-based objects (e.g., a digital road sign indicating roadworks, a road sign, traffic cones, traffic barriers, or other road objects that influence a direction of traffic) within a location of the WWD event; (3) fails to detect one or more road objects (e.g., lane markings) at the location as indicated by map data; (4) detects a change with respect to one or more road objects at the location as indicated by map data; (5) detects that a relative distance between the front of the vehicle and other objects (e.g., other vehicles, barriers, etc.) is less than a threshold distance (e.g., the relative distance becomes less than 4.2 meters) at the location; (6) detects that a speed at which the vehicle 105 and another vehicle converge exceeds a threshold speed (e.g., a speed at which the vehicle is moving); or (7) a combination thereof. In one embodiment, the WWD assessment platform 123 receives the WWD data when a confidence value associated the WWD event reaches or exceed a threshold value (e.g., 75 percent). In such embodiment, the confidence value increases as a number of positive indications of the WWD event increases.

In step 703, the WWD assessment platform 123 determines one or more attributes associated with the WWD event based on sensor data, map data, or a combination thereof. The WWD assessment platform 123 may acquire the sensor data from one or more sources that are involved in the WWD event. The one or more sources may be: (1) the vehicle (e.g., vehicle 105) that has detected the existence of the WWD event; (2) one or more detection entities 113 that are in the location of the WWD event at an initial time point at which the vehicle has generated the indication of the WWD event; (3) one or more detection entities 113 that were in the location of the WWD event at one or more prior time points; (4) one or more detection entities 113 that are predicted be in the location of the WWD event at one or more future time points; (6) the database 125; (7) the services platform 115; (8) one or more content providers 119; or (9) a combination thereof. By way of example, a window of period in which the WWD assessment platform 123 relies on the one or more detection entities 113 may be within several minutes to several hours with respect to the initial time point. The sensor data may indicate geographical attributes and/or dynamic attributes associated with the WWD events. The geographical attributes may indicate: (1) a number of traffic-based objects within the location of the WWD event; (2) a type of each traffic-based object within the location; (3) an orientation of each traffic-based object within the location; (4) a number of non-traffic-based objects within the location; (5) a type of each non-traffic-based object within the location (6) an orientation of each non-traffic-based object within the location; (7) a type of road in which the WWD event occurs; (8) a number of point-of-interests (POI) within the location; (9) a type of each POI within the location; (10) an orientation of each POI within the location; (11) a city/town in which the WWD event occurs; or (12) a combination thereof. The dynamic attributes may indicate: (1) a degree of traffic impacting the location of the WWD event; (2) a number of vehicles within the location; (3) a type of each vehicle within the location; (4) a heading of each vehicle within the location; (5) a time at which the WWD event occurs; (6) a date in which the WWD event occurs; (7) a weather condition of the location; (8) light-based attributes associated with the WWD event (e.g., a contrast level of light impacting the location of the WWD event, a brightness level of the light, a temperature level of the light, a sun angle associated with the location, etc); (9) whether the location is impacted by roadworks; or (x) a combination thereof. The WWD assessment platform 123 may also acquire map data associated with the location of the WWD event. The map data may include one or more data points indicating attributes (e.g., geographical attributes) associated with the location. Using the map data, the WWD assessment platform 123 may acquire map age data indicating an amount of time that one or more data points of map data associated with the location of the WWD event has not been updated. Each data point defines one or more attributes of one or more objects within the location (e.g., traffic-based object). For example, one of the data points may indicate that an existence of a traffic barrier within a location of a WWD event has not been validated for two days. In one embodiment, the WWD assessment platform 123 may determine a difference of one or more objects as indicated by the map data and the sensor data. For example, the sensor data may indicate an existence of a traffic barrier within the location of the WWD event; whereas, the map data does not include a datapoint that defines the traffic barrier within the location of the WWD event.

In step 705, the WWD assessment platform 123 trains a machine learning model for estimating a likelihood of one or more other WWD events based on the one or more attributes. Specifically, the machine learning model is trained to predict whether one or more locations within a road network induces one or more WWD events based on attributes associated with the one or more locations. In one embodiment, the machine learning model may be random forest, logistic, decision trees, neural networks, or a combination thereof.

Figure 8:
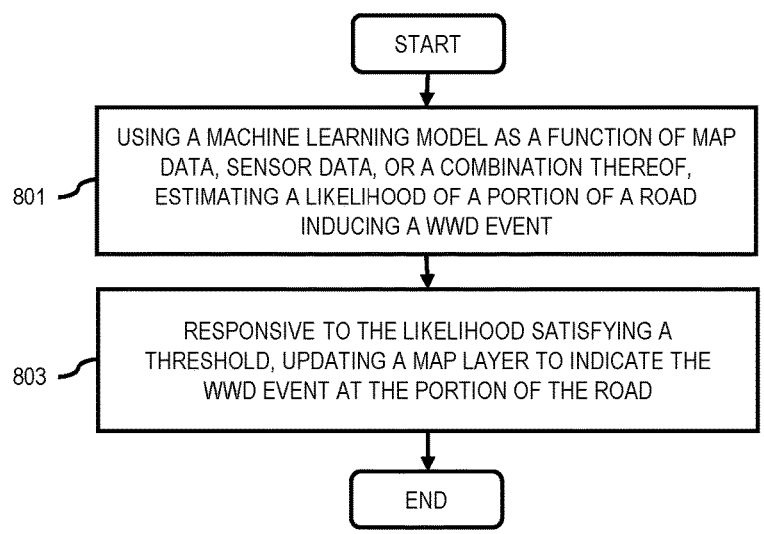
FIG. 8 illustrates a flowchart of a process for providing a map layer of potential WWD events.

FIG. 8 is a flowchart of a process 800 for providing a map layer of potential WWD events. In one embodiment, the WWD assessment platform 123 performs the process 800 and is implemented in, for instance, a chip set including a processor and a memory as shown in FIG. 10.

In step 801, the WDD assessment platform 123 estimates a likelihood of a portion of a road that induces a WWD event by using a machine learning model as a function of map data, sensor data, or a combination thereof. The sensor data may be acquired from the vehicle 105, one or more detection entities 113, or a combination thereof. The sensor data may indicate geographical attributes and/or dynamic attributes associated with the WWD events. The geographical attributes may indicate: (1) a number of traffic-based objects within the location of the WWD event; (2) a type of each traffic-based object within the location; (3) an orientation of each traffic-based object within the location; (4) a number of non-traffic-based objects within the location; (5) a type of each non-traffic-based object within the location (6) an orientation of each non-traffic-based object within the location; (7) a type of road in which the WWD event occurs; (8) a number of point-of-interests (POI) within the location; (9) a type of each POI within the location; (10) an orientation of each POI within the location; (11) a city/town in which the WWD event occurs; or (12) a combination thereof. The dynamic attributes may indicate: (1) a degree of traffic impacting the location of the WWD event; (2) a number of vehicles within the location; (3) a type of each vehicle within the location; (4) a heading of each vehicle within the location; (5) a time at which the WWD event occurs; (6) a date in which the WWD event occurs; (7) a weather condition of the location; (8) light-based attributes associated with the WWD event (e.g., a contrast level of light impacting the location of the WWD event, a brightness level of the light, a temperature level of the light, a sun angle associated with the location, etc); (9) whether the location is impacted by roadworks; or (x) a combination thereof. The WWD assessment platform 123 may also acquire map data associated with the location of the WWD event. The map data may include one or more data points indicating attributes (e.g., geographical attributes) associated with the location.

In step 803, if the likelihood satisfies a threshold, the WWD assessment platform 123 updates a map layer to indicate the WWD event at the portion of the road. The map layer may indicate the WWD event and one or more other WWD events that are predicted to occur at one or more other portions of one or more other roads within a road network.

The system, apparatus, and methods described herein enable a map-based server/platform to train a machine learning model to predict WWD events and provide a map layer of predicted WWD events, thereby enabling vehicle operators to identify locations of the predicted WWD events and determine routes of vehicles based on the locations. As such, overall safety within a road network is improved.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
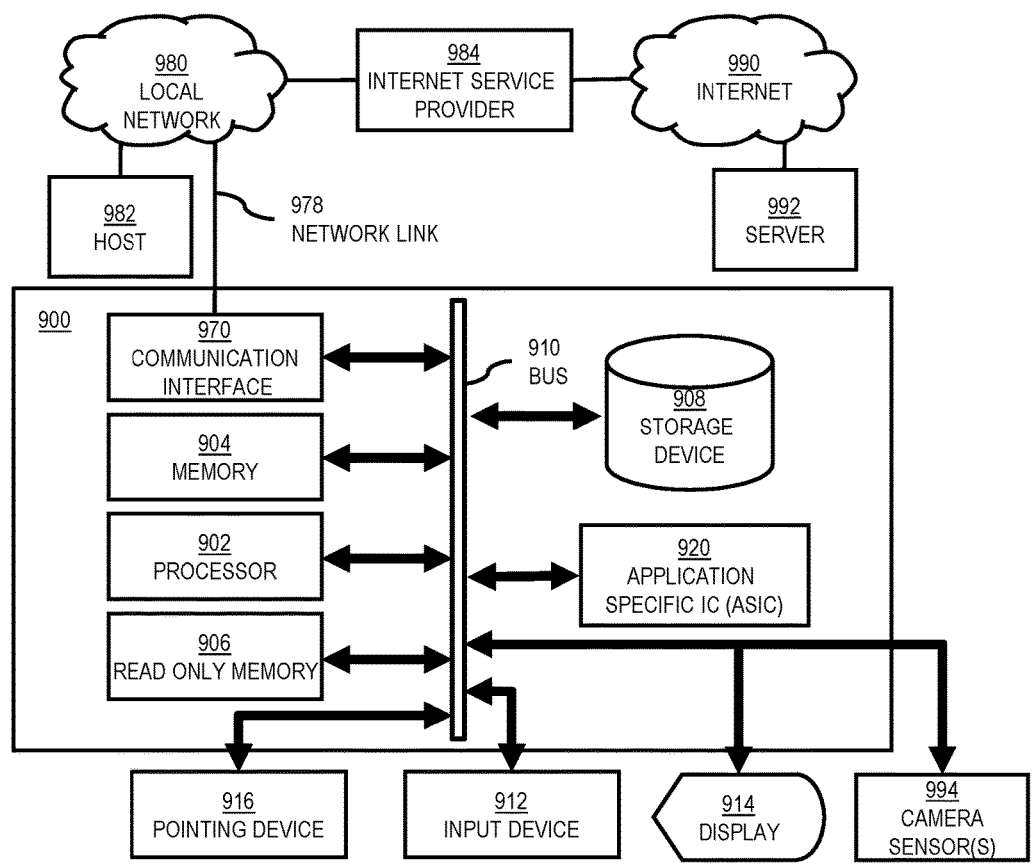
FIG. 9 illustrates a computer system upon which an embodiment may be implemented.

FIG. 9 illustrates a computer system 900 upon which an embodiment may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to predict WWD events, as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for predicting WWD events.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to predicting WWD events. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for predicting WWD events. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for predicting WWD events, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 9104 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general, the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 9100.

A computer called a server host 982 connected to the Internet hosts a process that provides a service in response to information received over the Internet. For example, server host 982 hosts a process that provides information representing video data for presentation at display 914. It is contemplated that the components of system 900 can be deployed in various configurations within other computer systems, e.g., host 982 and server 9102.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 9100 among others, through network link 978 and communications interface 970. In an example using the Internet 9100, a server host 982 transmits program code for a particular application, requested by a message sent from computer 900, through Internet 9100, ISP equipment 984, local network 980 and communications interface 970. The received code may be executed by processor 902 as it is received or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment may be implemented. Chip set 1000 is programmed to predict WWD events as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for predicting WWD events.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors. The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to predict WWD events The memory 1005 also stores the data associated with or generated by the execution of the inventive steps.

Figure 11:
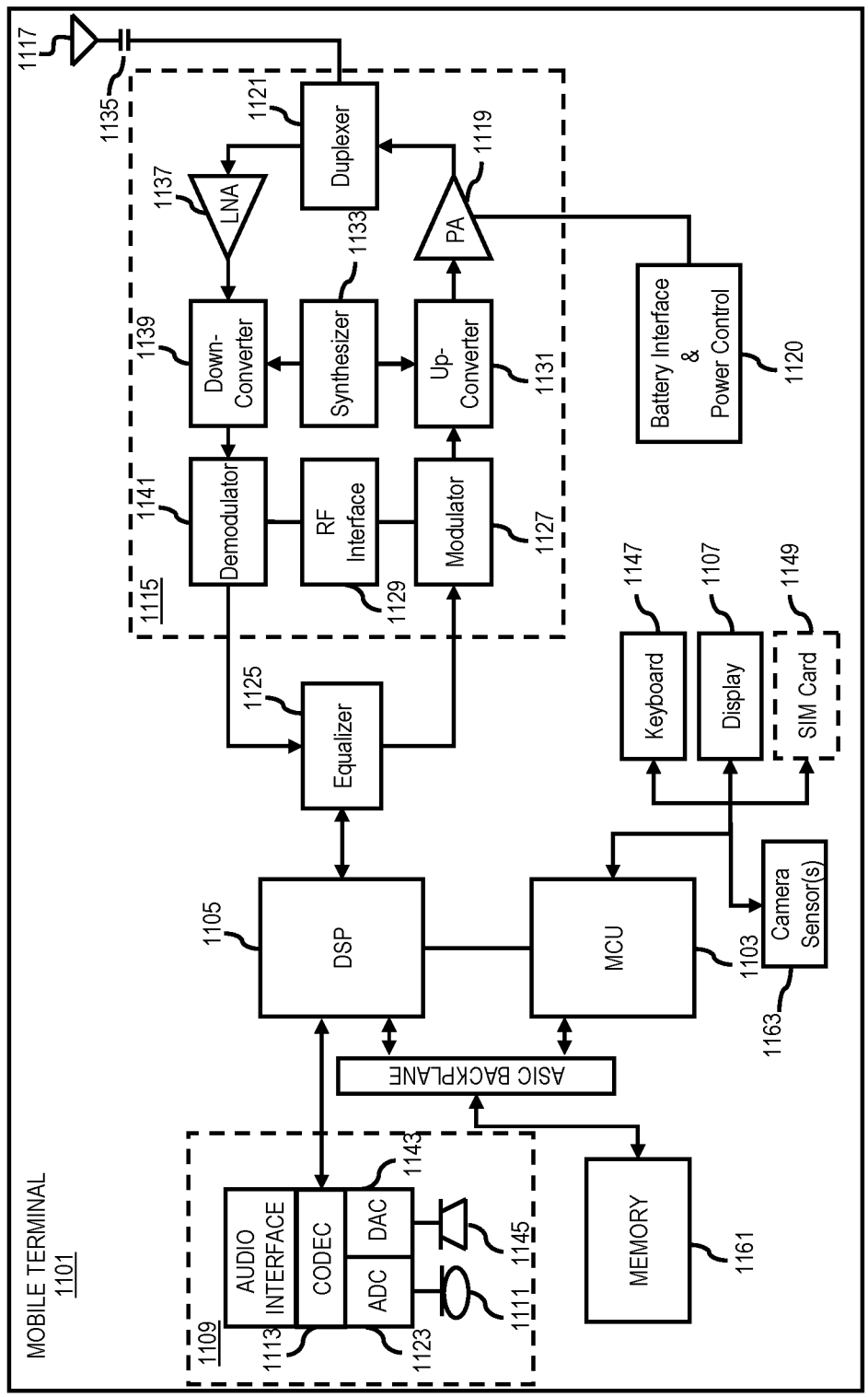
FIG. 11 illustrates a diagram of exemplary components of a mobile terminal for communications, which is capable of operating in the system of FIG. 1.

FIG. 11 is a diagram of exemplary components of a mobile terminal 1101 (e.g., a mobile device or vehicle or part thereof) for communications, which is capable of operating in the system of FIG. 1, according to one embodiment. In some embodiments, mobile terminal 1101, or a portion thereof, constitutes a means for predicting WWD events. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover, if applicable, to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of predicting WWD events. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to predict WWD events. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   receive wrong-way-driving (WWD) data indicating a WWD event, wherein the WWD event defines an event in which a vehicle travels in a direction opposing a traffic direction designated for a portion of a road;
   responsive to receiving the WWD data, determine one or more attributes associated with the WWD event based on sensor data, map data, or a combination thereof, wherein the one or more attributes indicates an amount of time that a data point of the map data has not been updated, the data point defining one or more objects within a location of the WWD event; and
   train a machine learning model for estimating a likelihood of one or more other WWD events based on the one or more attributes.

2. The apparatus of claim 1, wherein the one or more attributes include one or more geographical attributes associated with the WWD event, one or more dynamic attributes associated with the WWD event, or a combination thereof.

3. The apparatus of claim 2, wherein the one or more geographical attributes indicates: (i) a number of traffic-based objects within a location of the WWD event; (ii) a type of each traffic-based object within the location; (iii) an orientation of each traffic-based object within the location; (iv) a number of non-traffic-based objects within the location; (v) a type of each non-traffic-based object within the location (vi) an orientation of each non-traffic-based object within the location; (vii) a type of road in which the WWD event occurs; (viii) a number of point-of-interests (POI) within the location; (ix) a type of each POI within the location; (x) an orientation of each POI within the location; or (xi) a combination thereof.

4. The apparatus of claim 2, wherein the vehicle is a first vehicle, and wherein the one or more dynamic attributes indicates: (i) a degree of traffic impacting a location of the WWD event; (ii) a number of second vehicles within the location; (iii) a type of each second vehicle within the location; (iv) a heading of each second vehicle within the location; (v) a time at which the WWD event occurs; (vi) a date in which the WWD event occurs; (vii) a weather condition of the location; (viii) light-based attributes associated with the WWD event; (ix) whether the location is impacted by roadworks; or (x) a combination thereof.

5. The apparatus of claim 1, wherein the sensor data is acquired from: (i) the vehicle; (ii) one or more other vehicles within a location of the WWD event; (iii) one or more roadside sensors within the location; or (iv) a combination thereof.

6. The apparatus of claim 1, wherein the one or more attributes is used as ground truth data for training the machine learning model.

7. A non-transitory computer-readable storage medium having computer program code instructions stored therein, the computer program code instructions, when executed by at least one processor, cause the at least one processor to:
   determine a route associated with a vehicle;
   using a machine learning model as a function of map data, sensor data, or a combination thereof, estimate a likelihood of the route including a portion of a road inducing a wrong-way-driving (WWD) event, wherein the WWD event defines an event in which a vehicle travels in a direction opposing a traffic direction designated for the portion, and wherein the machine learning model is trained to predict the WWD event based on one or more attributes associated with one or more past WWD events; and
   responsive to the likelihood satisfying a threshold, cause a notification to: (i) a user device associated with the vehicle; (ii) the vehicle; or (iii) a combination thereof.

8. The non-transitory computer-readable storage medium of claim 7, wherein the sensor data is acquired from: (i) one or more other vehicles within the route; (ii) one or more roadside sensors within the route; or (iii) a combination thereof.

9. The non-transitory computer-readable storage medium of claim 7, wherein the one or more attributes includes one or more geographical attributes associated with each of the one or more past WWD events, one or more dynamic attributes associated with each of the one or more past WWD events, or a combination thereof.

10. The non-transitory computer-readable storage medium of claim 9, wherein the one or more geographical attributes indicates: (i) a number of traffic-based objects within a location of each of the one or more past WWD events; (ii) a type of each traffic-based object within the location; (iii) an orientation of each traffic-based object within the location; (iv) a number of non-traffic-based objects within the location; (v) a type of each non-traffic-based object within the location (vi) an orientation of each non-traffic-based object within the location; (vii) a type of road in which each of the one or more past WWD events has occurred; (viii) a number of point-of-interests (POI) within the location; (ix) a type of each POI within the location; (x) an orientation of each POI within the location; or (xi) a combination thereof.

11. The non-transitory computer-readable storage medium of claim 9, wherein the vehicle is a first vehicle, and wherein the one or more dynamic attributes indicates: (i) a degree of traffic associated with a location of each of the one or more past WWD events; (ii) a number of second vehicles within the location; (iii) a type of each second vehicle within the location; (iv) a heading of each second vehicle within the location; (v) a time at which each of the one or more past WWD events has occurred; (vi) a date in which each of the one or more past WWD events has occurred; (vii) a weather condition of the location; (viii) light-attributes associated with each of the one or more past WWD events; (ix) whether the location was impacted by roadworks; or (x) a combination thereof.

12. The non-transitory computer-readable storage medium of claim 7, wherein the computer program code instructions, when executed by the at least one processor, further cause the at least one processor to, responsive to the likelihood satisfying the threshold, generate an alternative route for the vehicle.

13. The non-transitory computer-readable storage medium of claim 7, wherein the vehicle is a first vehicle, and wherein the computer program code instructions, when executed by the at least one processor, further cause the at least one processor to, responsive to the likelihood satisfying the threshold and the first vehicle being proximate to the portion:
determine one or more paths of travel for one or more second vehicles proximate to the first vehicle; and
cause the first vehicle to move based on the one or more paths of travel.

14. The non-transitory computer-readable storage medium of claim 7, wherein the vehicle is a first vehicle, and wherein the computer program code instructions, when executed by the at least one processor, further cause the at least one processor to, responsive to the likelihood satisfying the threshold:
cause a notification to a designated vehicle;
determine a path of travel for the designated vehicle; and
cause the vehicle to traverse the portion based on the path of travel.

15. A method of determining a route based on one or more predicted wrong-way-driving (WWD) events, the method comprising:
receiving a destination for a vehicle as input;
using a machine learning model as a function of map data, sensor data, or a combination thereof, estimating a likelihood of a first subset of a plurality of road segments inducing a WWD event, wherein the WWD event defines an event in which a vehicle travels in a direction opposing a traffic direction designated for a portion of a road, and wherein the machine learning model is trained to predict the WWD event based on a combination of attributes associated with one or more past WWD events; and
responsive to the likelihood satisfying a threshold, selecting a second subset from the plurality of road segments as the route to the destination.

16. The method of claim 15, wherein the second subset excludes the first subset.

17. The method of claim 15, wherein the sensor data is acquired from: (i) one or more other vehicles within the plurality of road segments; (ii) one or more roadside sensors within the plurality of road segments; or (iii) a combination thereof.

18. The method of claim 15, wherein the attributes include geographical attributes, and wherein the geographical attributes indicate: (i) a number of traffic-based objects within a location of each of the one or more past WWD events; (ii) a type of each traffic-based object within the location; (iii) an orientation of each traffic-based object within the location; (iv) a number of non-traffic-based objects within the location; (v) a type of each non-traffic-based object within the location (vi) an orientation of each non-traffic-based object within the location; (vii) a type of road in which each of the one or more past WWD events has occurred; (viii) a number of point-of-interests (POI) within the location; (ix) a type of each POI within the location; (x) an orientation of each POI within the location; or (xi) a combination thereof.

19. The method of claim 15, wherein the attributes include dynamic attributes, wherein the vehicle is a first vehicle, and wherein the dynamic attributes indicate: (i) a degree of traffic that has impacted a location of each of the one or more past WWD events; (ii) a number of second vehicles within the location; (iii) a type of each second vehicle within the location; (iv) a heading of each second vehicle within the location; (v) a time at which each of the one or more past WWD events has occurred; (vi) a date in which each of the one or more past WWD events has occurred; (vii) a weather condition of the location; (viii) light-based attributes associated with each of the one or more past WWD events; (ix) whether the location was impacted by roadworks; or (x) a combination thereof.

* * * * *